United States Patent
Kataria et al.

(10) Patent No.: US 11,983,438 B2
(45) Date of Patent: May 14, 2024

(54) TECHNIQUE FOR IMPROVING OPERATIONS LOG INDEXING

(71) Applicant: Nutanix, Inc., San Jose, CA (US)

(72) Inventors: Alok Nemchand Kataria, Maharashtra (IN); Niranjan Sanjiv Pendharkar, Maharashtra (IN); Pete Wyckoff, Durham, NC (US); Shubham Shukla, Bhopal (IN); Tabrez Parvez Memon, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/218,766

(22) Filed: Mar. 31, 2021

(65) Prior Publication Data

US 2022/0253243 A1     Aug. 11, 2022

(30) Foreign Application Priority Data

Feb. 9, 2021    (IN) .............................. 202141005466

(51) Int. Cl.
*G06F 12/00*     (2006.01)
*G06F 3/06*     (2006.01)

(52) U.S. Cl.
CPC .......... *G06F 3/0659* (2013.01); *G06F 3/0611* (2013.01); *G06F 3/0619* (2013.01); *G06F 3/0664* (2013.01); *G06F 3/067* (2013.01)

(58) Field of Classification Search
CPC .... G06F 3/0659; G06F 3/0611; G06F 3/0619; G06F 3/0664; G06F 3/067
See application file for complete search history.

(56) References Cited

U.S. PATENT DOCUMENTS 8,290,972 B1 * 10/2012 Deshmukh ........ G06F 16/24556
707/758
8,549,518 B1   10/2013 Aron et al.
(Continued)

OTHER PUBLICATIONS

Cano, Ignacio, "Curator: Self-Managing Storage for Enterprise Clusters" University of Washington; published Mar. 2017; pp. all.
(Continued)

*Primary Examiner* — David Yi
*Assistant Examiner* — Tahilba O Puche
(74) *Attorney, Agent, or Firm* — Cesari and McKenna, LLP

(57) ABSTRACT

A technique improves implementation of an index for an operations log (oplog) that coalesces random write operations directed to a virtual disk (vdisk) stored on an extent store. The oplog temporarily caches data associated with the random write operations (i.e., write data) as well as metadata describing the write data. The metadata includes descriptors to the write data stored on virtual address regions, i.e., offset ranges, of the vdisk and are used to identify the offset ranges of write data for the vdisk that are cached in the oplog. To facilitate fast lookup operations of the offset ranges when determining whether write data is cached in the oplog, an oplog index provides a state of the latest data for offset ranges of the vdisk. The technique improves implementation of the oplog index by storing the oplog index in storage class memory, such as persistent memory, to obviate failure and subsequent recovery of the oplog index.

19 Claims, 8 Drawing Sheets

(56) References Cited

U.S. PATENT DOCUMENTS

| | | | |
|---|---|---|---|
| 8,601,473 B1 | 12/2013 | Aron et al. | |
| 8,612,382 B1* | 12/2013 | Patel | G06F 11/0793 |
| | | | 707/639 |
| 8,850,130 B1 | 9/2014 | Aron et al. | |
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 2011/0022819 A1* | 1/2011 | Post | G06F 12/1009 |
| | | | 711/E12.001 |
| 2015/0081966 A1* | 3/2015 | Zheng | G06F 3/0689 |
| | | | 711/114 |
| 2016/0077761 A1* | 3/2016 | Stabrawa | G06F 3/067 |
| | | | 711/172 |
| 2016/0350013 A1* | 12/2016 | Aron | G06F 11/2056 |
| 2017/0212680 A1* | 7/2017 | Waghulde | G06F 3/0616 |
| 2017/0242751 A1* | 8/2017 | Czezatke | G06F 11/1076 |
| 2017/0300388 A1* | 10/2017 | Zheng | G06F 11/1464 |
| 2017/0315740 A1* | 11/2017 | Corsi | G06F 13/4282 |
| 2018/0011852 A1* | 1/2018 | Bennett | G06F 16/2228 |
| 2018/0253255 A1* | 9/2018 | Jain | G06F 3/0673 |
| 2020/0097404 A1* | 3/2020 | Cason | G06F 12/0646 |
| 2020/0218748 A1* | 7/2020 | Liu | G06F 16/24532 |
| 2020/0311015 A1* | 10/2020 | Xu | G06F 9/5022 |
| 2020/0333968 A1* | 10/2020 | Bortnikov | G06F 3/0685 |
| 2021/0011888 A1 | 1/2021 | George et al. | |
| 2021/0089411 A1 | 3/2021 | Prasad et al. | |
| 2022/0188042 A1 | 6/2022 | Tatiparthi et al. | |
| 2022/0217204 A1 | 7/2022 | Tatiparthi et al. | |
| 2022/0244856 A1 | 8/2022 | Kataria et al. | |
| 2022/0358087 A1 | 11/2022 | Gupta et al. | |
| 2023/0078081 A1* | 3/2023 | Lai | G06F 16/2246 |
| | | | 707/797 |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

TECHNIQUE FOR IMPROVING OPERATIONS LOG INDEXING

CROSS-REFERENCE TO RELATED APPLICATIONS

The present application claims the benefit of India Provisional Patent Application Serial No. 202141005466, which was filed on Feb. 9, 2021, by Alok Nemchand Kataria, et al. for TECHNIQUE FOR IMPROVING OPERATIONS LOG INDEXING, which is hereby incorporated by reference.

BACKGROUND

Technical Field

The present disclosure relates to indexing of a log, such as an operations log (oplog), used by nodes of a cluster and, more specifically, to improvement of an oplog log index implementation used to process input/output accesses by the nodes of the cluster.

Background Information

A plurality of nodes interconnected as a cluster may be configured to provide compute and storage services for information, i.e., data and metadata, stored as storage objects, such as files, on storage devices organized as one or more storage tiers. A user running client software (e.g., an application) may access the information stored in a file using input/output (I/O) accesses in accordance with filesystem protocols. Typically, these protocols specify that a node should not send a reply, e.g., an acknowledgement, to an application issuing an I/O access, such as a write of data, to the file until the data is stored on persistent storage media as provided by a backend storage tier of the cluster. However, storage of the data on the backend storage tier may incur latencies.

Various means to reduce the acknowledgement latency when persistently storing data on a backend storage tier may include use of a log that allows acknowledgement of the write operations (writes) as soon as the data are recorded in the log, thereby deferring processing of the writes to the backend storage tier. A log index associating regions of a virtual disk to the logged data may also be used to improve access to data stored on the log. However, upon a failure/crash of the node, the log index typically has to be rebuilt (recovered) in order to allow access to the virtual disk for data not yet stored on the backend storage tier (i.e., data only recorded in the log), which recovery may be time-consuming. This results in generally restricted log sizes to avoid excessive recovery times and limits the amount of data that can be recorded in the log.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
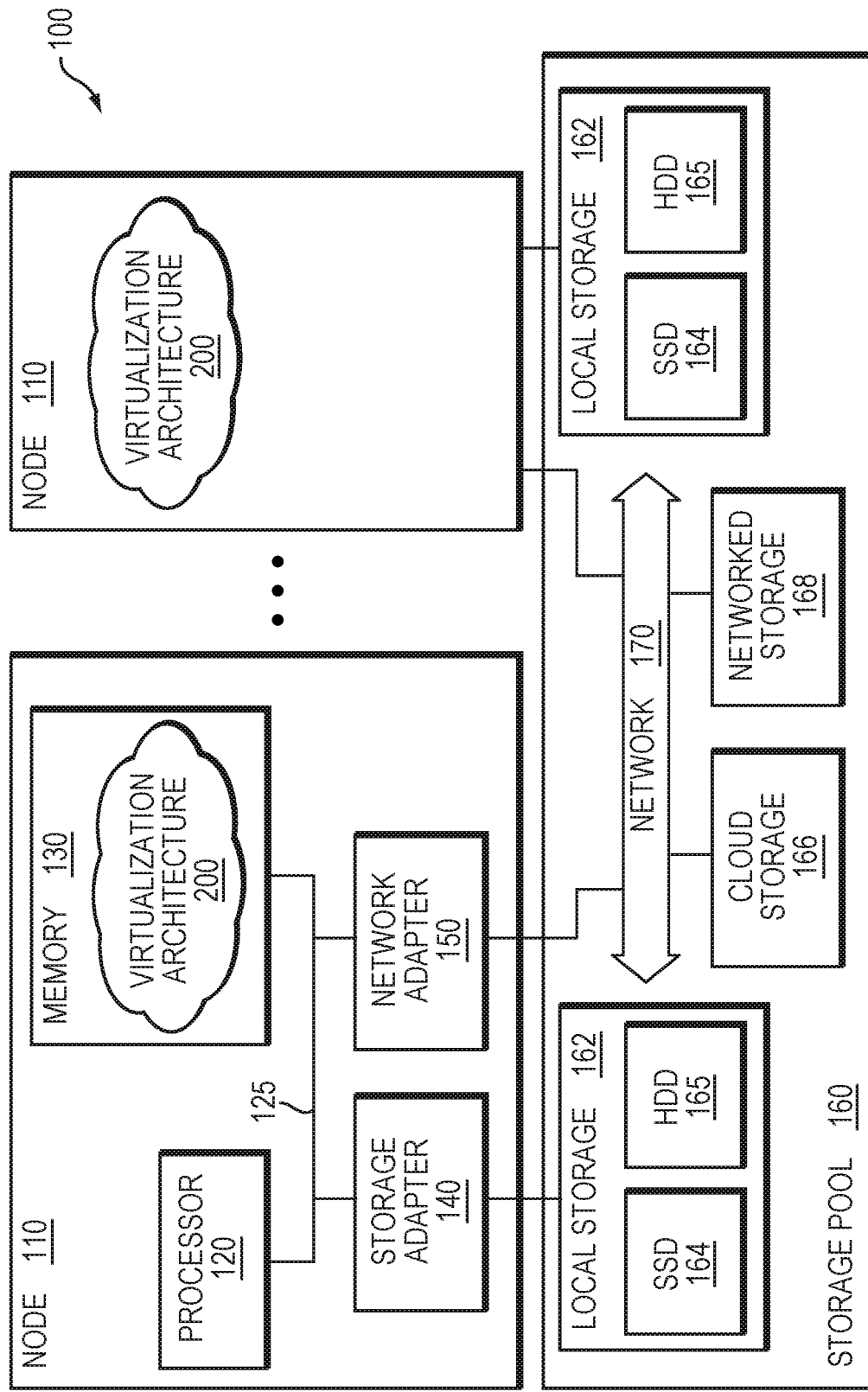
FIG. 1 is a block diagram of a plurality of nodes interconnected as a cluster in a virtualized environment.

The embodiments described herein are directed to a technique configured to improve implementation of an index for a log stored on a node of a cluster. The log is illustratively embodied as an operations log (oplog) that functions as a staging area to coalesce input/output (I/O) accesses, such as random write operations, directed to a virtual disk (vdisk) hosted by the node and stored on a backend storage tier organized as an extent store of a distributed storage fabric (DSF). The oplog temporarily stores (caches) data associated with the random write operations (i.e., write data) as well as metadata describing the write data. The metadata includes descriptors (i.e., pointers) to the write data stored on virtual address regions, i.e., offset ranges, of the vdisk and, thus, are used to identify the offset ranges of write data for the vdisk that are cached (captured) in the oplog. To facilitate fast lookup operations of the offset ranges when determining whether write data is captured in the oplog, a data structure, e.g., binary search tree, is embodied as an oplog index configured to provide a state of the latest data for offset ranges of the vdisk. The technique improves implementation of the oplog index by (1) storing the oplog index in storage class memory, such as persistent memory (PMEM); (2) distributing and managing portions of the oplog index between different classes of memory, such as dynamic random access memory (DRAM) and PMEM; (3) storing the oplog entirely in PMEM; and (4) caching the PMEM-based oplog in DRAM. In essence, failure and subsequent recovery of the oplog index may be obviated by a persistent storage implementation of the oplog index that allows continued servicing of client I/O accesses to the vdisk.

According to the technique, the persistent oplog index implementation provides performance improvements that yield lower latency due to reduced index search time, while providing persistence storage of the oplog index through use of different storage media, such as DRAM and PMEM. For example, in one embodiment, a multi-level oplog index may be implemented where leaf node structures (leaf-nodes) of the search tree are stored in PMEM and more frequently accessed intermediate node structures (intermediate-nodes) of the tree are stored in DRAM. In another embodiment, the entire oplog index may be stored in PMEM (PMEM-based oplog index) and subsequently cached in DRAM with copy-back to the PMEM for changes. In yet another embodiment, the PMEM-based oplog index may be demand paged into DRAM, which lowers a memory footprint of the oplog index in DRAM.

Additional improvements provided by the persistent oplog index storage implementation may be directed to handling of corruptions to ensure data integrity of the oplog index stored in PMEM (e.g., PMEM storage devices) by performing checksums on oplog index entries in software to ward against common software errors (e.g., rogue pointers and erroneous overwrite of data) and silent data corruption. Here, a checksum is recorded for each offset range ingested by the oplog index and the recorded checksum is validated on every oplog index access. In addition, the entries of the oplog index may be "scrubbed" (i.e., verified and corrected) based on comparing recorded checksums against performed checksums of entries of oplog index and retrieving (i.e., fetching) replicas from across nodes of the cluster for correction when a mismatch (error) is discovered.

Advantageously, the technique provides storage of the oplog index (as well as the oplog data and metafiles) in PMEM, which provides additional persistent storage so as to effectively increase memory space while maintaining performance and failover benefits without increasing memory usage (footprint). Notably, storage of the oplog index on PMEM also allows use of substantially (e.g., several times) larger oplogs for vdisks with near-zero recovery time. The larger oplogs in turn facilitate capture of larger application working sets and random write operations with little impact (cost) to performance, recovery times and resiliency. Moreover, storage of the entire oplog index in PMEM substantially reduces DRAM usage (e.g., memory footprint to zero) for oplog indices. In the event of a node crash, recovery of the oplog index may be obviated due to persistent storage on PMEM and the vdisk may continue to be used (i.e., uninterrupted I/O access) by client software. Therefore, replication of the oplog index across nodes of the cluster may substantially reduce recovery time (e.g., to almost zero) thereby allowing bigger (i.e., increase-sized) oplogs capable of improved I/O servicing (e.g., greater cache hits from a larger oplog) that results in higher throughput while maintaining low latency.

DESCRIPTION

FIG. 1 is a block diagram of a plurality of nodes 110 interconnected as a cluster 100 and configured to provide compute and storage services for information, data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 and a remote cluster over the LAN and WAN (hereinafter "network"). The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs) The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
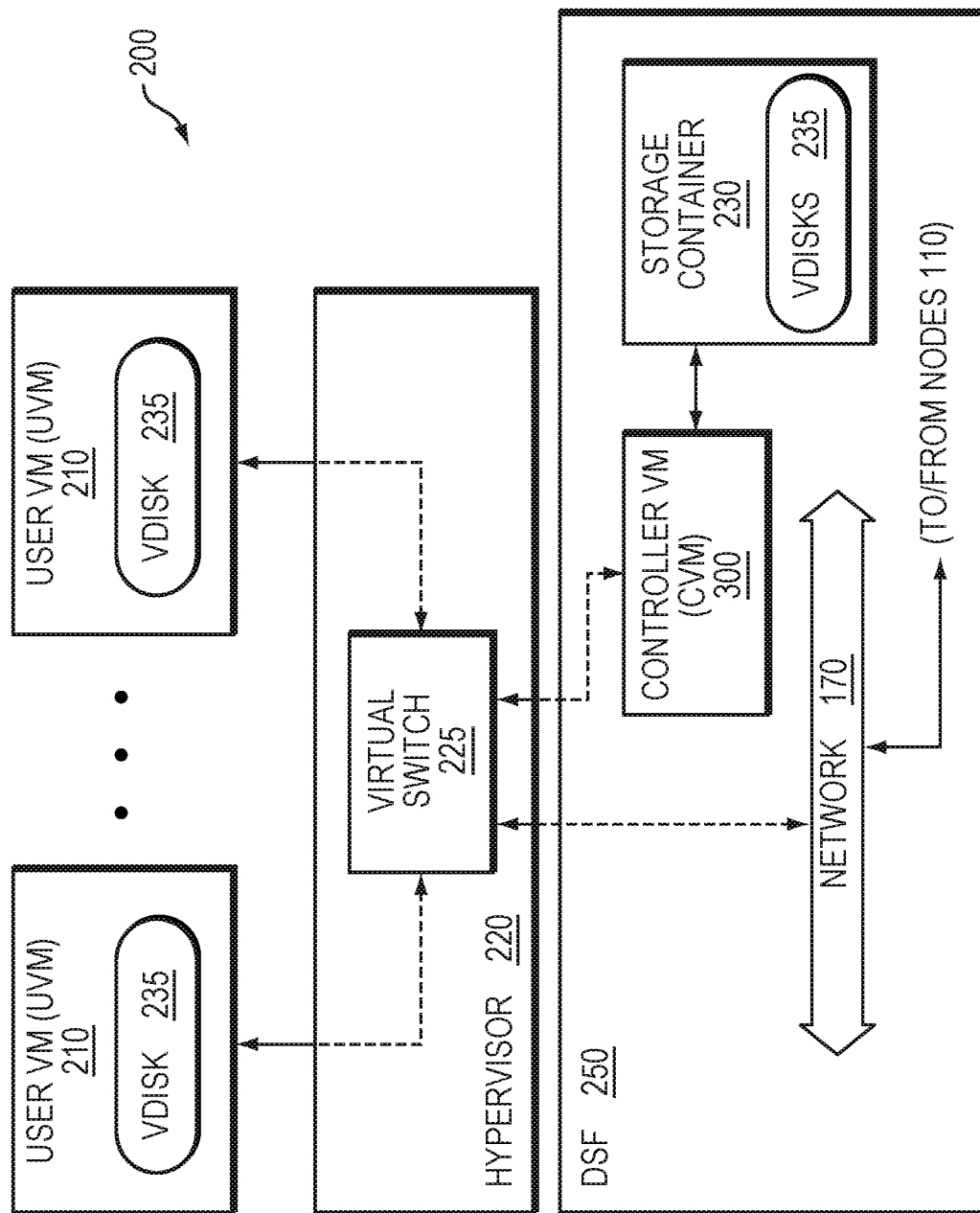
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the duster. As such, the duster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system ((IFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSP 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110, The UVM 210 may issue the I/O accesses as a SCSI protocol request to the storage device. Illustratively, the hypervisor 220 intercepts the SCSI request and converts it to an CIFS, or NFS request as part of its hardware emulation layer. As previously, noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300, This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires services. The IP-based storage protocol request may, be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM.

The CVM 300 is configured and structured to properly interpret and process that request. Notably the IP-based storage protocol request packets may remain in the node 110 when the communication the request and the response begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
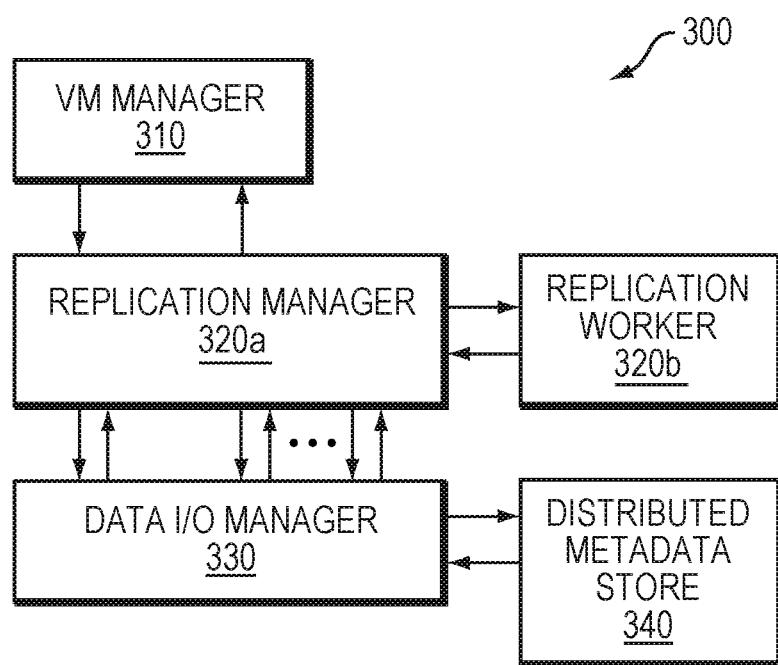
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DST 250 of the duster 100. Illustratively, the CVM 300 runs as a virtual machine above the hypervisor 220 on each node and cooperates with other CVMs in the duster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NTS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320*a* is configured to provide replication and disaster recovery capabilities of DSF 250. Such capabilities include migration/failover of virtual machines and containers, as well as scheduling of snapshots. In an embodiment, the replication manager 320*a* may interact with one or more replication workers 320*b*. A data I/O manager 330 is responsible for all data management and I/O operations in DSF 250 and provides a main interface to/from the hypervisor 220, e.g., via the IP-based storage protocols. Illustratively, the data. I/O manager 330 presents a vdisk 235 to the UVM 210 in order to service I/O access requests by the UVM to the DES. A distributed metadata store 340 stores and manages all metadata, in the node/cluster, including metadata structures that store metadata used to locate (map) the actual content of vdisks on the storage devices of the cluster.

Figure 4:
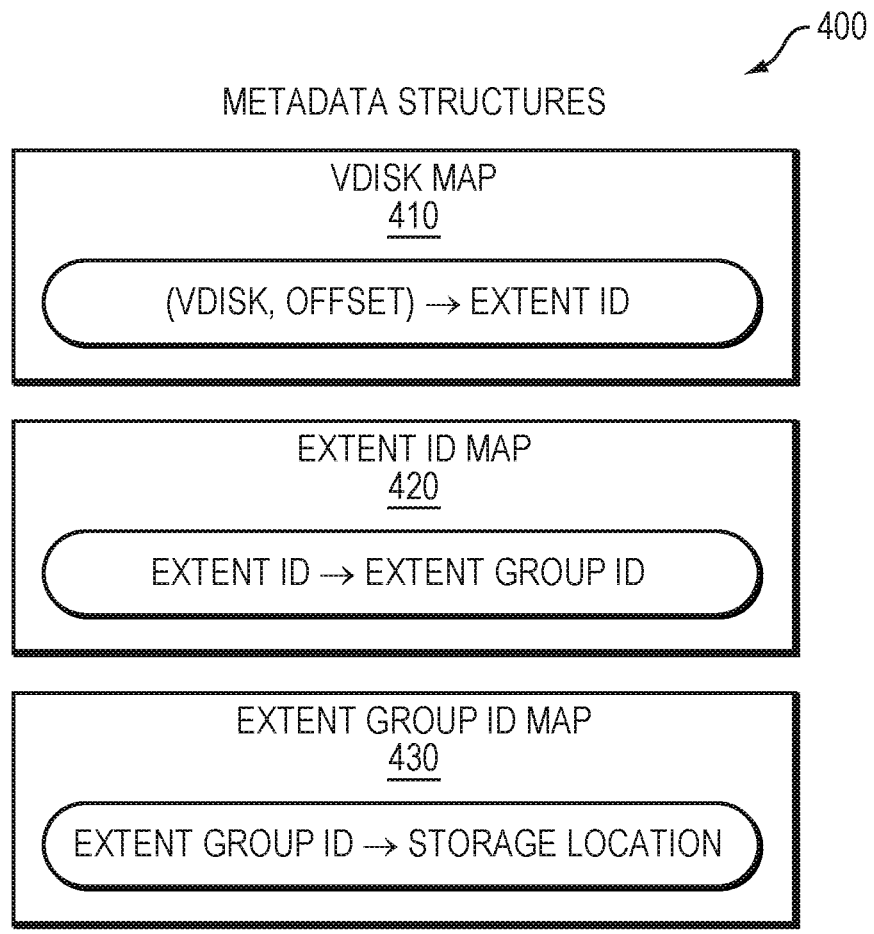
FIG. 4 is a block diagram of metadata structures used to map virtual disks (vdisks) of the virtualization architecture.

FIG. 4 is block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of predetermined storage, e.g., 1 MB, corresponding to a virtual address space of the that is used as the basis of metadata block map structures (maps) described herein. The data in each vblock is physically stored on a storage device in units called extents. Extents may be written/read/modified on a subextent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices, which may be further organized as an extent store.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent, A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5:
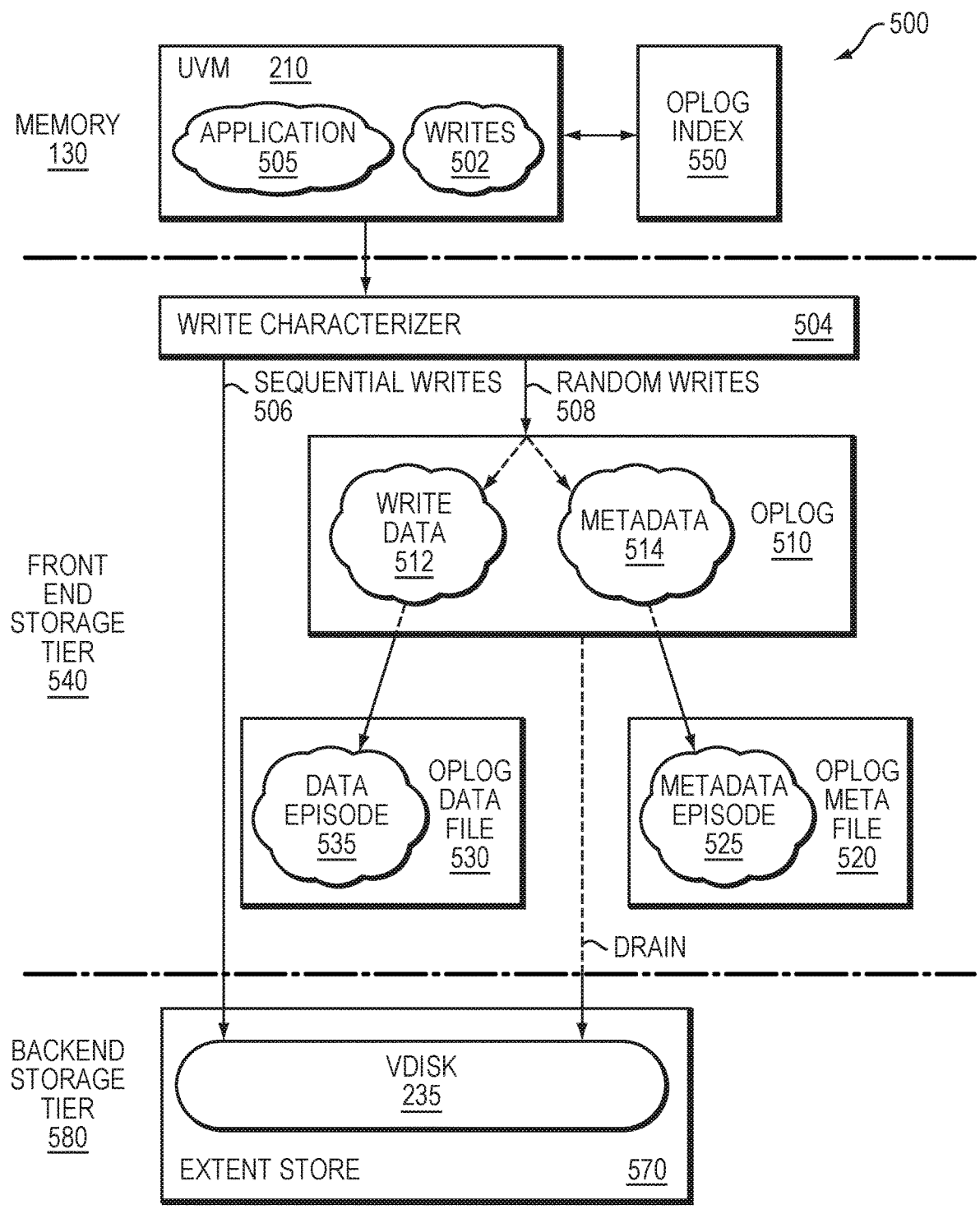
FIG. 5 is a diagram illustrating an exemplary input/output (I/O) path of the virtualization architecture.

FIG. 5 is a diagram illustrating an exemplary input/output (I/O) path 500 of the virtualization architecture. An application 505 running in UVM 210 issues I/O accesses, such as write operations (writes) 502, to vdisk 235 exported from a backend storage tier 580 organized as an extent store 570 of DSF 250. The writes 502 are received at a write characterizer 504, e.g., of data I/O manager 330. Illustratively, writes 502 are characterized based on write pattern and either (1) forwarded by the write characterizer 504 directly to the vdisk 235 as sequential writes 506 on the extent store 570 (e.g., larger block sequential writes resulting in pending queue sizes above a threshold); or (2) temporarily stored (cached) as random writes 508 (and smaller block sequential writes resulting in pending queue sizes below the threshold) at a log illustratively embodied as an operations log (oplog) 510, coalesced and sequentially drained to the extent store 570 (e.g., large block random writes). Note that the pending queue size threshold used to characterize the writes may be adjusted (e.g., lowered) as data stored in the oplog reaches capacity so that more writes 502 are forwarded directly to the extent store bypassing storage in the oplog. The oplog 510 functions as a staging area to coalesce the random writes 508 as a batch for periodic forwarding (draining) in a single operation to the extent store 570. In an embodiment, there is one oplog 510 associated with each vdisk 235, wherein the oplog 510 is persistently stored on the storage stack of the CVM 300 within a fast frontend storage tier 540 of DSF 250, e.g., on non-volatile memory express (NVMe) storage devices. Persistent storage of the oplog 510 on the frontend tier 540 enables fast acknowledgment of the random writes 508 issued by the application 505 running in UVM 210. In essence, the write characterizer 504 cooperates with the oplog 510 to manage the latencies (e.g., acknowledgement latency and backend storage latency) of the random writes 508.

Illustratively, the oplog 510 caches (captures) the data associated with the random writes (i.e., write data 512) and the metadata 514 describing the write data. The metadata 514 includes descriptors (i.e., pointers) to the write data 512 stored on virtual address regions, i.e., offset ranges, of the vdisk 235 and, thus, are used to identify the offset ranges of write data 512 for the vdisk 235 that are captured in the oplog 510. The captured metadata 514 of the oplog 510 is batched (collected) into one or more groups of predetermined size or number of entries, e.g., 250 KiB or 5000 entries, and recorded as one or more incremental images (metadata episodes 525) of metadata records in an oplog metafile 520 on the frontend storage tier 540. Similarly, the captured write data 512 may be grouped to a predetermined size, e.g., 500 MB, and recorded as one or more data episodes 535 of data in an oplog data file 530 on the frontend storage tier 540. Each episode of the oplog data and metafiles is marked with a timestamp identifier (ID) (i.e., a timestamp used as an identifier).

In an embodiment, the episodes of the oplog data file 530 and oplog metafile 520 are replicated across one or more nodes 110 (e.g., a primary node and a secondary node) of the cluster 100 according to a replication factor (RF) algorithm used for vdisk replication to ensure global redundancy protection and availability of data in the cluster. Illustratively, the data I/O manager 330 is a data plane process configured to perform a data and metadata replication procedure between the primary node and a data I/O manager "peer" on the secondary node, as described further herein. To that end, the data I/O manager 330 may employ remote direct memory access (RDMA) capabilities integrated in its code path used for vdisk replication in accordance with RF data protection to replicate the oplog data and metadata episodes across the nodes. Note that additional information may be stored on the distributed metadata store, such as (i) the node locations of the oplog metafiles (including RF replicas) for the replicated vdisk as well as (ii) identifiers (IDs) denoting beginning and ending (e.g., lowest and highest timestamps) of valid records in the episodes of those files. Durable storage of such information facilitates replication of the metadata episodes 525 from the primary node to the secondary node as described herein.

To facilitate fast lookup operations of the offset ranges when determining whether write data 512 is captured in the oplog 510, a data structure, e.g., binary search tree such as a B (B+) tree, is embodied as an oplog index 550 configured to provide a state of the latest data for offset ranges of the vdisk 235. In an embodiment, the oplog index 550 is stored in memory 130, e.g., dynamic random access memory storage devices (DRAM), of node 110 to provide an in-core representation of the oplog metafile 520. Instead of performing a sequential read through the oplog metafile 520 to determine offset ranges for random writes 508 captured in the oplog 510, the oplog index 550 may be examined (i.e., searched) to quickly determine the offset ranges for the latest data written to the vdisk 235.

As the random writes 508 of the metadata episodes 525 are periodically drained to the extent store 570, e.g., by a background process, the oplog metafile 520 associated with the drained writes is deleted (garbage collected) from the frontend storage tier 540. The data I/O manager 330 may send the appropriate metadata episodes 525, e.g., via a remote procedure call, to the secondary node in accordance with the replication procedure. Alternatively, the data I/O manager 330 may send the IDs of the metadata episodes 525 to the secondary node, which may then fetch appropriate node location information of the metadata records of the metadata episodes 525 from the distributed metadata store 340 to enable retrieval of the metadata records from the extent store 570. In either case, a representation of the oplog index 550 is conveyed (i.e., the episode metadata records of the oplog metafile) between the nodes, such that the secondary node is constantly receiving the metadata needed to build (or update) the oplog index 550 at the secondary node. Once the metadata episodes 525 are applied to the oplog index 550, the information relating to the episodes may be deleted from the distributed metadata store 340.

In the event of a primary node failure/crash, the oplog index 550 may be recovered (rebuilt) on the secondary node using either a copy (replica) of the oplog metafile 520 that was replicated on the secondary node in accordance with the RF data protection algorithm or the metadata episodes 525 stored on the extent store 570. Recovery may be implemented by replaying metadata records of the episodes 525 not yet applied to an existing oplog index starting from the beginning of the file and proceeding forwards to construct an up-to-date (i.e., at a time of the failover) copy of the oplog index data structure in memory of the secondary node. However, when recovering from scratch (i.e., not reconstructing from an existing oplog index), metadata records of the episodes 525 are applied from the end of the file and proceeding backwards to construct an up-to-date (i.e., at a time of the failover) copy of the oplog index. Note that recovery of the oplog index in memory of the secondary node may increase memory usage on that node. In addition, to accommodate increased random writes, the size of the oplog may increase which, in turn, increases the oplog index memory usage. Moreover, I/O accesses, such as reads and writes, to the vdisk 235 may be suspended during recovery because of the inability to determine whether offset ranges of the I/O accesses overlap with random writes 508 captured in the oplog 510 while the oplog index is being constructed at the secondary node. Yet, suspension of I/O accesses may impact compute and storage service performance of the cluster 100.

The embodiments described herein are directed to a technique configured to improve implementation of a log (e.g., an oplog) index stored on a node of a cluster by (1) storing the oplog index in storage class memory, such as persistent memory (PMEM); (2) distributing and managing portions of the oplog index between different classes of memory, such as DRAM and PMEM; (3) storing the oplog entirely in PMEM organized in a data structure for efficient data retrieval without need of a separate oplog index; and (4) caching the PMEM-based oplog in DRAM. In essence, failure and subsequent recovery of the oplog index may be obviated by a persistent storage implementation of the oplog index (as well as the oplog data and metadata) that allows continued servicing of client I/O accesses to the vdisk on the node, while maintaining or improving I/O access latency resulting from increase-sized oplogs.

Figure 6:
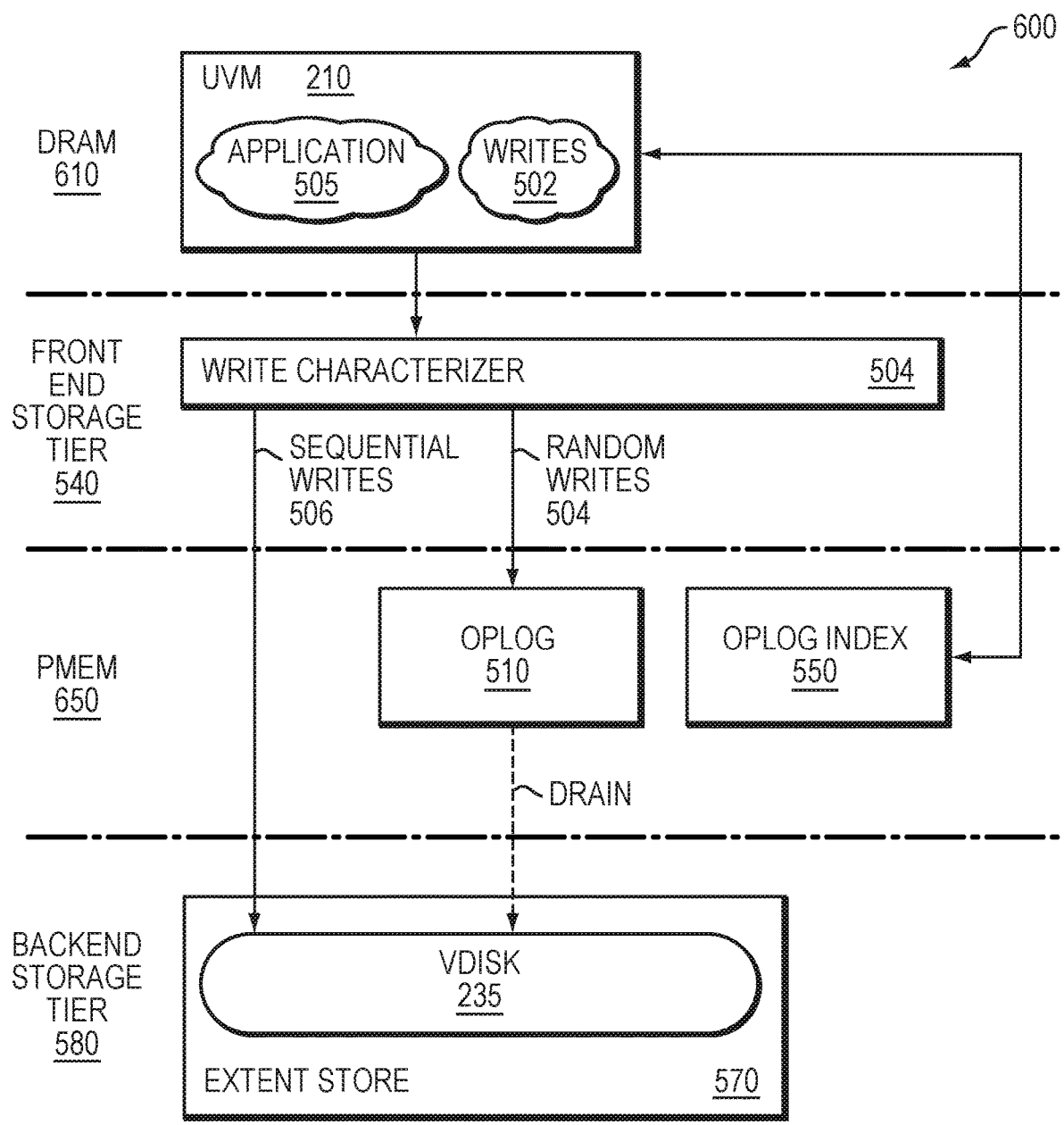
FIG. 6 is a diagram illustrating a technique for improving implementation of an operations log (oplog) index.

FIG. 6 is a diagram illustrating the technique for improving implementation of an oplog index. Illustratively, the technique 600 provides a persistent storage class memory tier of the DSF 250, e.g., PMEM storage devices ("PMEM 650"), within the I/O path of the virtualization architecture for persistently storing the oplog index 550. In addition, performance improvements of the oplog index 550 may be realized through use of different classes of storage media, such as DRAM 610 (e.g., embodied as memory 130) and PMEM 650. Performance improvements provided by the persistent oplog index implementation(s) described herein enable faster lookups to the oplog index 550 stored on PMEM 650, even though such lookups may be slower (e.g., higher latency and reduced bandwidth) than DRAM 610. That is, the technique trades-off different characteristics (e.g., speed vs. capacity) of classes of storage media to exploit an overall I/O access performance improvement to the vdisk 235. For example, PMEM accesses are generally slower (e.g., approximately 2× slower) than DRAM accesses, but PMEM devices have greater capacity (e.g., ~4× capacity). Persistent storage guarantees of PMEM implementations typically require that each write 502 captured by a PMEM device be flushed to underlying storage media of the device. Nevertheless, overall performance improvements are obtained from increased-sized oplog indices (i.e., higher hit rates in the oplog) even when stored in part on slower storage media (e.g., PMEM) but in combination with other parts of the oplog indices stored on faster (i.e., faster index search) storage media (e.g., DRAM). This yields lower client I/O access latency due to using the oplog to retrieve data that allows for greater throughput in storing the data to backend storage.

Figure 7:
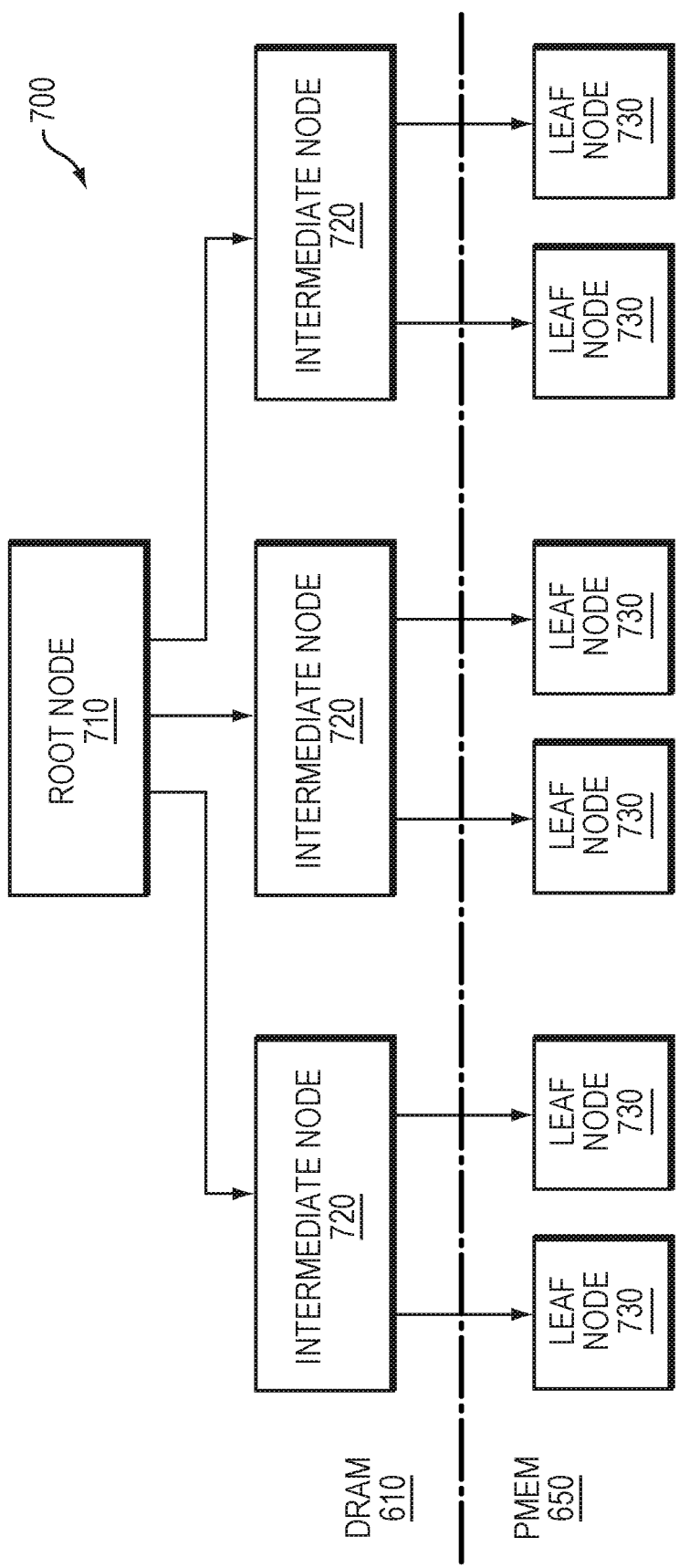
FIG. 7 is a diagram illustrating an exemplary multi-level implementation of the oplog index.

In one embodiment, PMEM 650 may be used to store at least a portion of the oplog index data structure according to a multi-level oplog index implementation. FIG. 7 is a diagram illustrating an exemplary multi-level implementation 700 of the oplog index. In an embodiment, the oplog index 650 may be implemented as a B+ tree configured to efficiently organize the metadata (e.g., offset ranges) when searching (i.e., search by offset range) the index to service I/O accesses. To that end, the B+ tree has a root node structure (root 710), one or more intermediate node structures (intermediate-nodes 720) and a plurality of leaf node structures (leaf-nodes 730). According to the multi-level implementation, the leaf-nodes 730 of the tree are stored in PMEM 650 and the more frequently accessed intermediate-nodes 720 (and root node 710) of the tree are stored in DRAM 610. The multi-level implementation may leverage certain properties of the B+ tree to reduce latencies associated with searching, including storage of the leaf nodes 730 as sequentially accessible, e.g., as one or more linked lists. Also, since it has a much higher fan-out than a binary search tree, the illustrative B+ tree results in more efficient lookup operations. Therefore, the multi-level oplog index implementation 700 may be used to obviate an entire index tree lookup in PMEM 650. In this manner, the storage density and persistent characteristics of storage class memory may be exploited while maintaining the low latency index lookup as if the index tree were entirely stored in faster DRAM.

In another embodiment, the entire oplog index 550 (e.g., the entire B+ tree including root, intermediate and leaf nodes) may be stored in PMEM 650 and subsequently cached in DRAM 610 with copy-back for changes. In yet another embodiment, the PMEM-based oplog index tree may be demand paged into DRAM 610 (e.g., in-core memory 130), each of which lowers a memory footprint. For example, a predetermined portion of the memory 130 may be organized as a cache reserved for paging in the oplog index 550. Intermediate-nodes 720 of the tree may then be demand-paged in-core (DRAM 610) from PMEM 650, as needed, to improve lookup operations.

Additional improvements provided by the persistent oplog index storage implementation may be directed to handling of corruptions in the oplog index 550 stored in PMEM 650 (e.g., PMEM storage devices). For example, in response to failure of certain blocks of PMEM devices, PMEM libraries (such as persistent memory development kit libraries) may be configured to enable detection of the failed (bad) block and the metadata contents of the detected bad blocks may be selectively moved to new blocks on the PMEM devices. The oplog index 550 may then be updated to reference (point to) locations of the new blocks. For instance, assume the affected metadata of the oplog index fit on a page (cache line) boundary. In response to a detected bad block, the metadata contents of the page may be moved to new (different) locations on the PMEM devices and the oplog index may be updated to reflect those new locations.

Corruptions in the oplog index 550 stored in PMEM 650 may be further addressed by performing checksums on oplog index entries in software to ward against common software errors (e.g., rogue pointers and erroneous overwrite of data) and silent data corruption. For example, the checksum may be employed to ensure consistency of the metadata episode contents of the oplog metafile 520, which may be corrupted, e.g., during transfer from the primary node to the secondary node. The corrupted episode metafile contents may then be used to construct metadata pointers of the DRAM-based intermediate-nodes 720 of the oplog index to the PMEM-based leaf-nodes 730. Here, a checksum may be created and recorded for each offset range ingested by the oplog index 550 and the recorded checksum may be used to validate one or more entries of the oplog index (e.g., recorded checksum compared to live performed checksum for the entry) on every oplog index access.

Moreover, the entries of the oplog index 550 may be "scrubbed" (i.e., verified and corrected) based on comparing recorded checksums against performed checksums of the entries of oplog index and retrieving (i.e., fetching) replicas from across nodes of the cluster for correction (repair), when a mismatch is discovered. In an embodiment, a metadata scrubber may be spawned (e.g., by the data I/O manager 330) as a background process to traverse the oplog index and validate the entries and, upon discovering an error (i.e., mismatch between recorded and live performed checksums), fetch metadata records from the oplog metafile 520 to repair (cure) the error. Alternatively, the metadata scrubber may be configured to constantly (always) compare the entries in the oplog index 550 with the metadata episodes 525 of the oplog metafile 520 to detect (e.g., discover mismatches) and correct data integrity errors or discrepancies (i.e., retrieve replicas). The metadata scrubber may also be configured to identify the corrupted pointers and its associated referenced/ mapped regions and facilitate remapping to new locations on the PMEM devices for data integrity errors that are attributable to malfunctioning or exhausted memory devices.

To address sudden PMEM storage capacity limitations (e.g., when a primary node fails or when the number of vdisks hosted on the node increases), a further embodiment of the technique may be employed that efficiently utilizes PMEM 650 by aggressive draining of oplog entries to reduce a size of the oplog index 550 that can be supported by a given size of DRAM 610 for mixed-storage-media-class oplog index implementations. That is, PMEM use may be reduced to accommodate a reduction in either PMEM and/or DRAM availability for storing the oplog index. Recall that drained oplog entries represent data safely flushed to the extent store 570 and that can be fetched by DSF 250 without the need for the oplog 510 or oplog index 550. Aggressive draining of the oplog entries may further be employed where a vdisk 235 is rehosted on another node (e.g., a secondary node) that does not have sufficient PMEM storage capacity to store an oplog index replica. In this situation, that node may be able to recover the oplog 510 and operate with the oplog index replica by changing a mix of storage media classes for the oplog index that is implemented, e.g., entirely in DRAM 610. That is, the oplog index storage may be dynamically adjusted between storage media classes (e.g., DRAM and PMEM) according to a relative availability of those storage media classes for a node hosting the vdisk, which may include storing the oplog index entirely in either storage media class. More particularly, for an oplog index organized as a multi-level data structure, the technique may apportion the multi-level data structure such that a more frequently accessed level of the data structure during search may be stored in a storage medium class having a lowest access time and a greatest-sized level of the multi-level data structure may be stored in a storage medium class having a greatest storage density.

Figure 8:
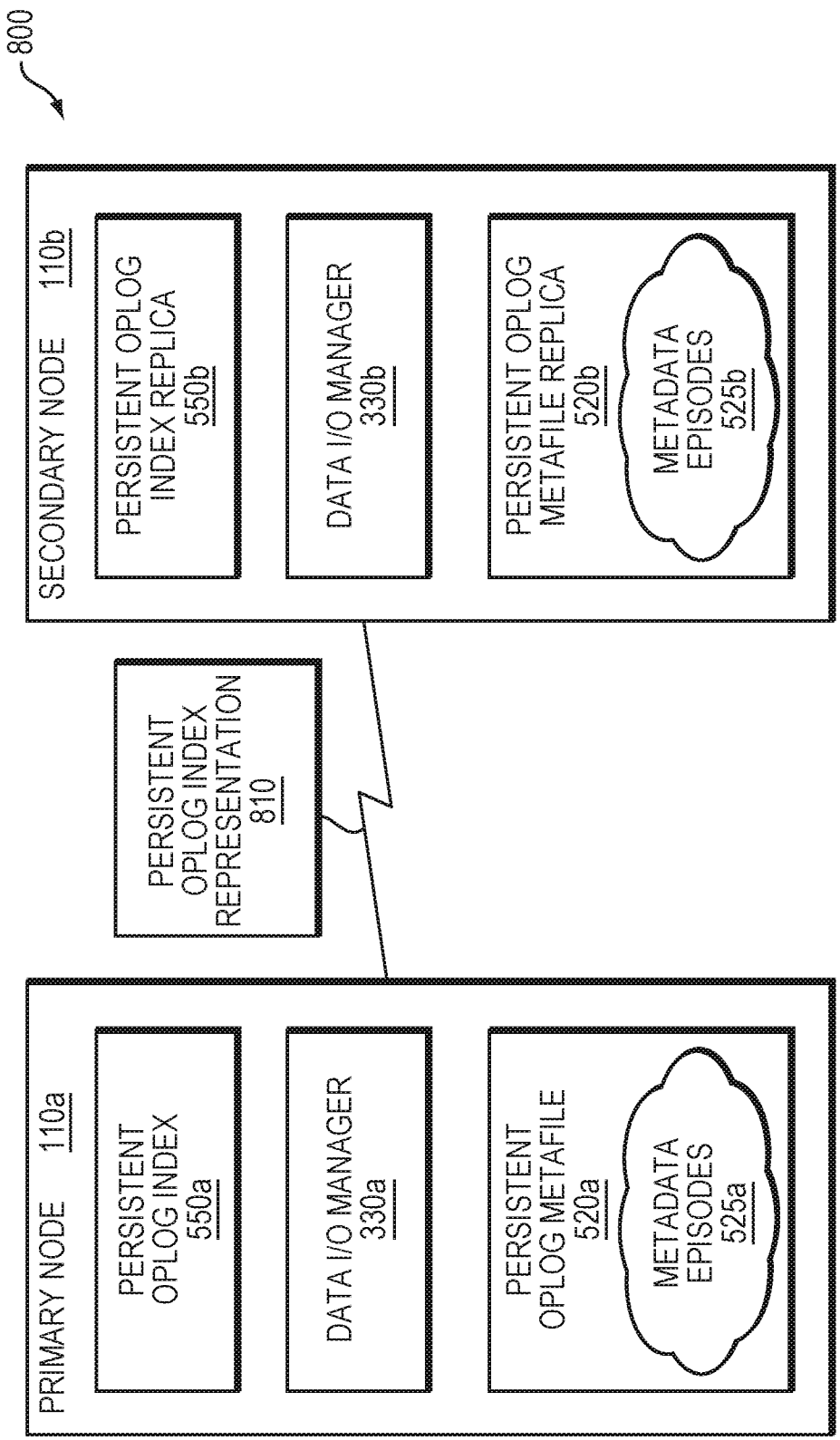
FIG. 8 is a diagram illustrating an exemplary replication of a persistent oplog index among one or more nodes of the cluster.

The technique described herein further enhances the persistent storage implementation of the oplog index through the use of replication. For example, a vdisk hosted on a (primary) node having an oplog/oplog index stored on PMEM may have one or more additional nodes (e.g., a secondary and/or remote node) in the cluster selected to host a vdisk replica as well as an oplog/oplog index according to the RF data protection algorithm. FIG. 8 is a diagram illustrating an exemplary replication of a persistent, e.g., PMEM-based, oplog index among one or more nodes, such as a primary node 110*a* and a secondary node 110*b*, of the cluster 100. As noted, the data I/O manager 330*a* of primary node 110*a* sends a representation 810 of the persistent oplog index 550*a* (i.e., metadata records of metadata episodes 525*a* of the persistent oplog metafile 520*a*) to the secondary node 110*b* such that the secondary node is constantly receiving the metadata records needed to build (or update) a replica of the oplog index 550*b* in PMEM 650.

Illustratively, the secondary node 110*b* runs a continuous update and/or recovery (failover) procedure that replays the latest episodes 525*b* of the persistent oplog metafile replica 520*b* on its persistent oplog index replica 550*b* to effectively copy-by-reconstruction the persistent oplog index 550*a* of the primary node 110*a*. In effect, the secondary node 110*b* performs a non-stop (re)construction and synchronization of the persistent oplog index 550*a* of the primary node as if a failover had occurred. Because the replay is continuous on the secondary node, only a subset of metadata episodes 525*b* may be replayed at any time, so that a consistent copy of the primary node's persistent oplog index 550*a* is quickly updated on the secondary node (i.e., in milliseconds). As such, synchronization and update from the primary node 110*a* can occur to the secondary node 110*b* with near full I/O latency performance (i.e., little to no latency increase is incurred from replaying a latest episode at the secondary node during failover).

For example, assume that new offset ranges from random writes 508 are issued serially by application 505 running on the UVM 210 to vdisk 235, hosted on the primary node 110*a*, which results in a series of new entries added to the persistent oplog index 550*a* on PMEM 650 of the primary node. Illustratively, in response to each random write, the persistent oplog metafile 520*a* (and persistent oplog data file) on the primary node 110*a*, as well as the persistent oplog metafile replica 520*b* (and persistent oplog data file replica) on the secondary node 110*b*, are updated. Each persistent oplog index 550*a,b* is also updated to indicate that the offset range is within the persistent oplog 510. At this time, the completion of the random write 508 may be acknowledged to the application 505. Thereafter, a commit record is (asynchronously) written on the persistent oplog metafile 520 for a current batch of random write updates that has been durably replicated and drained, indicating that no rollover to a subsequent batch update is required (i.e., the random writes of the current batch are considered purged from the oplog).

Notably, replication of each new occurrence of an oplog index entry on the secondary node (i.e., in-line replication) may increase the latency for every random write 508 issued by the application 505 to the vdisk 235. Thus, instead of employing such in-line replication, the metadata episodes 525a of the persistent oplog metafile 520a may be leveraged to perform batch replication such that, upon the close of an episode 525a (i.e., after writing 500 MB of the data to the persistent oplog 510), the metadata records of the associated persistent oplog metafile 520a may be replicated to the secondary node 110b. According to the technique, creation of a metadata episode 525 establishes a consistency point of the persistent oplog metafile 520 that may be used as a trigger for persistent, oplog index replication and synchronization. For example, the latest episode ID created on the primary node 110a is durably stored (and maintained) on the distributed metadata store 340 and may be compared with the last episode ID replicated on the secondary node 110b. If necessary, the latest episode (and intervening episodes) of the persistent oplog metafile 520 may be retrieved from the extent store 570 and replayed to update the persistent oplog index replica 550b of the secondary node 110b.

In an embodiment, the data I/O manager 330a is configured to perform a data and metadata replication procedure between the primary node 110a and a data I/O manager "peer" 330b on the secondary node 110b. Efficient replication of the persistent, e.g., PMEM-based, oplog metafile 520a in PMEM 650 of the nodes may be realized as a result of RDMA capabilities of the data I/O manager and PMEM storage devices. Once an episode 525a is closed, the data I/O manager 330a of the primary node 110a informs the data I/O manager 330b on the secondary node 110b of the closure via a message exchange between of the nodes that includes the closed episode ID. In response, the data I/O manager 330b of the secondary node 110b fetches the appropriate metadata episodes of the oplog metafile 520 from the extent store 570 and replays the appropriate metadata records of the closed episode to update the persistent oplog index replica 550b of the secondary node 110b. Alternatively, the data I/O manager 330a of the primary node 110a may send the metadata records of the closed episode 525 directly to the data I/O manager 330b of the secondary node 110b for updating the persistent oplog index replica.

In either case, during update/recovery, the persistent oplog index replica is updated with any uncommitted (rolled over) batches of random write updates, as well as metadata records in any open metadata episodes. The data I/O managers may then update appropriate information in the distributed metadata store 340 indicating the latest updated episode in their persistent oplog indexes. Notably, a persistent oplog index representation 810 is conveyed (i.e., the episode metadata records of the persistent oplog metafile 520) between the nodes, such that the secondary node 110b is constantly receiving the metadata (e.g., the primary node replicates the metadata to the secondary node) needed to build the persistent oplog index replica 550b.

In an embodiment, replication of a persistent oplog index may be employed for fast failover of metadata used to construct the oplog index in the event of a failure of a node without downtime (i.e., I/O interruption) or significant metadata replay. For example, assume an oplog index for a vdisk hosted by the primary node is stored in-core (DRAM 610) and a persistent oplog index replica (for a vdisk replica) on the secondary node is stored on PMEM. If the primary node crashes, a remote node may be selected to host the vdisk and a persistent oplog index replica (according to RF data protection), and a fast synchronization is performed according to the failover and recovery procedure described herein. Note that the primary node failure does not substantially impact I/O performance and background recovery may be performed. The oplog index replica on the secondary node can be used to build and synchronize the failover persistent oplog index on the remote node.

While there have been shown and described illustrative embodiments for improving implementation of an oplog index stored on a node of a cluster, it is to be understood that various other adaptations and modifications may be made within the spirit and scope of the embodiments herein. For example, embodiments have been shown and described herein with relation to a persistent oplog index implementation that stores the oplog index in storage class memory, such as persistent memory (PMEM) and, in other embodiments, provides performance improvements, such as a multi-level oplog index configuration, that enable faster lookups to the oplog index stored on PMEM. However, the embodiments in their broader sense are not so limited, and may, in fact, allow for still further performance improvements of the persistent oplog index implementation.

For instance, in one or more embodiments, a probabilistic data structure, such as a bloom filter, may be employed to efficiently determine whether data is captured in the oplog to thereby further improve lookup operations to an oplog index stored in PMEM. As noted, before accessing data of a vdisk from the extent store, the oplog index is examined to ensure that the data is not captured in the oplog. Examination of the oplog index typically involves traversing the entire B+ tree to determine if the offset range of the data is in the index. However, there may be situations where certain I/O accesses (e.g., reads and writes) that typically bypass updating of the oplog still need to search (examine) the oplog index to determine whether there are overlapping offset ranges in the index. Such searches may be relatively costly in terms of latency for a PMEM-based oplog index. According to the technique, the bloom filter may be employed to avoid such costly searches. Here, the bloom filter may be configured to definitively indicate that data for a specified offset range is not stored in the oplog; yet the bloom filter may incorrectly indicate that the data for the offset range is stored in the oplog (i.e., a false positive). However, the possibility of a false positive may be greatly reduced by sizing the bloom filter correctly (i.e., with a correct number of bits).

Illustratively, the bloom filter may be stored in-core (in DRAM) and configured to efficiently track all offset ranges stored in the oplog. In one embodiment, a single counting bloom filter may be used to represent all valid offset ranges in the oplog index. In another embodiment, multiple (e.g., two) bloom filters may be used for the valid offset ranges in the oplog index. Here, a first "active" bloom filter is populated with offset ranges ingested into the oplog, while a second bloom filter is "frozen" for previous offset ranges. Once the previous ranges are drained from the oplog, the frozen bloom filter is deleted, the active bloom filter is marked as "frozen," and a new bloom filter is created and marked as "active" to capture new offset ranges ingested into the oplog. Note that the "frozen" bloom filter may still be used for locating data in the oplog not yet drained (i.e., persistently stored on the backend storage tier).

Advantageously, the technique described herein provides storage of the oplog index (as well as the oplog data and metafiles) in PMEM, which provides additional persistent storage so as to effectively increase memory space while maintaining performance and failover benefits without increasing memory usage. Notably, storage of the oplog index on PMEM also allows use of substantially (e.g., several times) larger oplogs for vdisks with near-zero recovery time. The larger oplogs in turn facilitate capture of larger application working sets and random write operations with little impact (cost) to performance, recovery times and resiliency. Moreover, storage of the entire oplog index in PMEM substantially reduces DRAM usage (e.g., memory footprint to zero) for oplog indices. In the event of a node crash, recovery of the oplog index may be obviated because the oplog data and metadata are persistently stored on PMEM and the vdisk may continue to be used (i.e., uninterrupted I/O access) by client software. Therefore, replication of the oplog index across nodes of the cluster may substantially reduce recovery time (e.g., to almost zero) thereby allowing increase-sized oplogs capable of improved I/O servicing (e.g., greater cache hits from a larger oplog) that results in higher throughput while maintaining low latency.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:
    record, in a persistent memory (PMEM) of a node of a cluster, metadata corresponding to input/output (I/O) write accesses having data directed to a virtual disk (vdisk) of the cluster, the metadata locating the data cached in an operations log (oplog) prior to persistent storage of the data at a backend of the cluster;
    index the metadata by offset ranges of the vdisk;
    store a first probabilistic data structure created from the metadata in a dynamic random access memory (DRAM) of the node, wherein the first probabilistic data structure includes locations of the data cached in the oplog and drained from the oplog;
    store in the DRAM, a second probabilistic data structure having the metadata locating the data cached in the oplog;
    in response to an I/O access having an offset directed to the vdisk, use the second probabilistic data structure and then the first probabilistic data structure to determine whether the offset is in the metadata; and
    in response to determining that the offset is in the metadata, search the metadata using the offset to locate and retrieve the data.

2. The non-transitory computer readable medium of claim 1, wherein the first and second probabilistic data structures are Bloom filters.

3. The non-transitory computer readable medium of claim 1, wherein the program instructions are further configured to:
    in response to a reduction in a total capacity of the DRAM and PMEM, drain the data cached in the oplog to the backend of the cluster to increase a capacity to store the metadata.

4. The non-transitory computer readable medium of claim 1, wherein the program instructions are further configured to:
    in response to the locations of the data in the oplog included in the first probabilistic data structure being drained from the oplog, mark the first probabilistic data structure as frozen for updates and create the second probabilistic data structure.

5. The non-transitory computer readable medium of claim 4, wherein the second probabilistic data structure is updated for locations of new data directed to the vdisk and cached in the oplog.

6. The non-transitory computer readable medium of claim 1, wherein the first probabilistic data structure is deleted once the data in the oplog having the locations in the first probabilistic data structure is drained from the oplog.

7. A method comprising:
    recording, in a storage class memory of a node of a cluster, metadata corresponding to input/output (I/O) write accesses having data directed to a virtual disk (vdisk) of the cluster, the metadata locating the data cached in an operations log (oplog) prior to persistent storage of the data at a backend of the cluster;
    indexing the metadata by offset ranges of the vdisk;
    storing a first Bloom filter created from the metadata in a dynamic random access memory (DRAM) of the node, wherein the first Bloom filter includes locations of the data cached in the oplog and drained from the oplog;
    storing in the DRAM, a second Bloom filter having the metadata locating the data cached in the oplog;
    in response to an I/O access having an offset directed to the vdisk, using the second Bloom filter and then the first Bloom filter to determine whether the offset is in the metadata; and
    in response to determining that the offset is in the metadata, searching the metadata to retrieve the offset to locate the data, wherein the second Bloom filter is deleted once the data in the oplog having the locations in the second Bloom filter is drained from the oplog.

8. A method comprising:
    recording, in a persistent memory (PMEM) of a node of a cluster, metadata corresponding to input/output (I/O) write accesses having data directed to a virtual disk (vdisk) of the cluster, the metadata locating the data cached in an operations log (oplog) prior to persistent storage of the data at a backend of the cluster;
    indexing the metadata by offset ranges of the vdisk;
    storing a first probabilistic data structure created from the metadata in a dynamic random access memory (DRAM) of the node, wherein the first probabilistic data structure includes locations of the data cached in the oplog and drained from the oplog;
    storing in the DRAM, a second probabilistic data structure having the metadata locating the data cached in the oplog;
    in response to an I/O access having an offset directed to the vdisk, using the second probabilistic data structure and then the first probabilistic data structure to determine whether the offset is in the metadata; and in response to determining that the offset is in the metadata, searching the metadata using the offset to locate and retrieve the data.

9. The method of claim 8, wherein the first and second probabilistic data structures are Bloom filters.

10. The method claim 8 further comprising:
in response to a reduction in a total capacity of the DRAM and PMEM, draining the data cached in the oplog to the backend of the cluster to increase a capacity to store the metadata.

11. The method of claim 8 further comprising:
in response to the locations of data in the oplog included in the first probabilistic data structure being drained from the oplog, marking the first probabilistic data structure as frozen for updates and create the second probabilistic data structure.

12. The method of claim 8, wherein the second probabilistic data structure is updated for locations of new data directed to the vdisk and cached in the oplog.

13. The method of claim 8, wherein the first probabilistic data structure is deleted once the data in the oplog having the locations in the first probabilistic data structure is drained from the oplog.

14. An apparatus comprising:
a cluster of nodes each having a processor and storage; and
a network interconnecting the nodes and connecting to a client, wherein the processors of the nodes are configured to:
record, in a persistent memory (PMEM) of a node of the cluster, metadata corresponding to input/output (I/O) write accesses having data from the client directed to a virtual disk (vdisk) of the cluster, the metadata locating the data cached in an operations log (oplog) prior to persistent storage of the data at a backend of the cluster;
index the metadata by offset ranges of the vdisk;
store a first probabilistic data structure created from the metadata in a dynamic random access memory (DRAM) of the node, wherein the first probabilistic data structure includes locations of the data cached in the oplog and drained from the oplog;
store in the DRAM, a second probabilistic data structure having the metadata locating the data cached in the oplog;
in response to an I/O access having an offset directed to the vdisk, use the second probabilistic data structure and then the first probabilistic data structure to determine whether the offset is in the metadata; and
in response to determining that the offset is in the metadata, search the metadata using the offset to locate and retrieve the data.

15. The apparatus of claim 14, wherein the first and second probabilistic data structures are Bloom filters.

16. The apparatus of claim 14 wherein the processors of the nodes are further configured to:
in response to a reduction in a total capacity of the DRAM and PMEM, drain the data cached in the oplog to the backend of the cluster to increase a capacity to store the metadata.

17. The apparatus of claim 14 wherein the processors of the nodes are further configured to:
in response to the locations of data in the oplog included in the first probabilistic data structure being drained from the oplog, mark the first probabilistic data structure as frozen for updates and create the second probabilistic data structure.

18. The apparatus of claim 14, wherein the second probabilistic data structure is updated for locations of new data directed to the vdisk and cached in the oplog.

19. The apparatus of claim 14, wherein the first probabilistic data structure is deleted once the data in the oplog having the locations in the first probabilistic data structure is drained from the oplog.

* * * * *